(12) United States Patent
Chen et al.

(10) Patent No.: US 11,367,236 B2
(45) Date of Patent: Jun. 21, 2022

(54) METHOD, APPARATUS AND DEVICE FOR GENERATING THREE-DIMENSIONAL LOCAL HUMAN BODY MODEL

(71) Applicant: Zhejiang SenseTime Technology Development Co., Ltd., Zhejiang (CN)

(72) Inventors: Chengju Chen, Hangzhou (CN);
Yazhen Yuan, Hangzhou (CN);
Chongshan Sheng, Hangzhou (CN);
Guofeng Zhang, Hangzhou (CN)

(73) Assignee: ZHEJIANG SENSETIME TECHNOLOGY DEVELOPMENT CO., LTD, Hangzhou (CN)

( * ) Notice: Subject to any disclaimer, the term of this patent is extended or adjusted under 35 U.S.C. 154(b) by 0 days.

(21) Appl. No.: 17/181,350

(22) Filed: Feb. 22, 2021

(65) Prior Publication Data
US 2021/0174568 A1    Jun. 10, 2021

Related U.S. Application Data

(63) Continuation of application No. PCT/CN2019/126625, filed on Dec. 19, 2019.

(30) Foreign Application Priority Data

May 15, 2019 (CN) .......................... 201910403882.9

(51) Int. Cl.
*G06T 13/40* (2011.01)
*G06T 17/20* (2006.01)

(52) U.S. Cl.
CPC .............. *G06T 13/40* (2013.01); *G06T 17/20* (2013.01); *G06T 2200/04* (2013.01)

(58) Field of Classification Search
None
See application file for complete search history.

(56) References Cited

U.S. PATENT DOCUMENTS

| 9,898,858 B2 | 2/2018 | Tamersoy et al. |
| 10,234,552 B1 | 3/2019 | Jazayeri |
| 2013/0250050 A1 | 9/2013 | Kanaujia et al. |

(Continued)

FOREIGN PATENT DOCUMENTS

| CN | 104268921 A | 1/2015 |
| CN | 104376594 A | 2/2015 |

(Continued)

OTHER PUBLICATIONS

First Office Action of the Korean application No. 10-2020-7030574, dated Aug. 20, 2021, 10 pgs.

(Continued)

*Primary Examiner* — Vu Nguyen
(74) *Attorney, Agent, or Firm* — Cooper Legal Group, LLC

(57) ABSTRACT

A method for generating a three-dimensional local human body model are provided in embodiments of the disclosure. The method for generating a three-dimensional local human body model includes: acquiring bone parameter adjustment information of a three-dimensional local human body model; adjusting bone parameters of the three-dimensional local human body model according to the bone parameter adjustment information; and generating the three-dimensional local human body model according to the adjusted bone parameters.

20 Claims, 19 Drawing Sheets

(56) References Cited

U.S. PATENT DOCUMENTS

2013/0342527 A1    12/2013  Molyneaux
2019/0325633 A1*   10/2019  Miller, IV .......... G06K 9/00375

FOREIGN PATENT DOCUMENTS

| | | |
|---|---|---|
| CN | 104463938 A | 3/2015 |
| CN | 107180453 A | 9/2017 |
| CN | 107680167 A | 2/2018 |
| CN | 107705365 A | 2/2018 |
| CN | 108305309 A | 7/2018 |
| CN | 108765551 A | 11/2018 |
| CN | 109191570 A | 1/2019 |
| CN | 109395390 A | 3/2019 |
| CN | 109523604 A | 3/2019 |
| CN | 109727302 A | 5/2019 |
| CN | 110111417 A | 8/2019 |
| JP | 2003044873 A | 2/2003 |
| JP | 2010267241 A | 11/2010 |
| JP | 2011107877 A | 6/2011 |
| JP | 2012043057 A | 3/2012 |
| JP | 2019512141 A | 5/2019 |
| KR | 20180069786 A | 6/2018 |
| WO | 2018207232 | 11/2018 |

OTHER PUBLICATIONS

International Search Report in the international application No. PCT/CN2019/126625, dated Mar. 19, 2020, 2 pgs.

First Office Action of the Chinese application No. 201910403882.9, dated May 28, 2020, 22 pgs.

Notice of Allowance of the Chinese application No. 201910403882.9, dated Mar. 23, 2021, 5 pgs.

"Development of Bone Extraction Visualization Software for 3D Human Model", May 2014, Xu Zhengpeng, Information Technology Series, vol. 2014 (9), 49 pgs.

"An Algorithm for Extracting Skeletons of 3D Scanned Human Body Models", 2013 Li Xuefei and Chen Min, IEEE, Ninth International Conference on Natural Computation (ICNC), pp. 1113-1117.

First Office Action of the Japanese application No. 2020-558527, dated Dec. 23, 2021, 8 pgs.

* cited by examiner

METHOD, APPARATUS AND DEVICE FOR GENERATING THREE-DIMENSIONAL LOCAL HUMAN BODY MODEL

CROSS REFERENCE TO RELATED APPLICATIONS

This application is a continuation of International Application No. PCT/CN2019/126625, filed on Dec. 19, 2019, which claims priority to Chinese Patent Application No. 201910403882.9, filed on May 15, 2019. The disclosures of International Application No. PCT/CN2019/126625 and Chinese Patent Application No. 201910403882.9 are hereby incorporated by reference in their entireties.

BACKGROUND

Driven by the gaming industry and virtual reality, digital virtual characters have been widely used. Virtual characters have evolved from a single virtual character to a character designed by a player, including the creation of a unique image, the selection of a suitable face makeup, and the like. At present, in the process of character generation, the shape of a model is usually adjusted by erecting a large number of bones.

SUMMARY

The disclosure relates to a method, apparatus and device for generating a three-dimensional local human body model.

The purpose of one or more embodiments of the disclosure is to provide a method, apparatus and device for generating a three-dimensional local human body model.

In a first aspect, a method for generating a three-dimensional local human body model is provided. The method includes that: bone parameter adjustment information of a three-dimensional local human body model is acquired; bone parameters of the three-dimensional local human body model are adjusted according to the bone parameter adjustment information; and the three-dimensional local human body model is generated according to the adjusted bone parameters.

In conjunction with any implementation provided by the disclosure, the operation that bone parameter adjustment information of a three-dimensional local human body model is acquired includes that: a bone parameter adjustment instruction is received; and the bone parameter adjustment information is determined according to the bone parameter adjustment instruction.

In conjunction with any implementation provided by the disclosure, the operation that bone parameters of the three-dimensional local human body model are adjusted according to the bone parameter adjustment information includes that: parameters of at least one bone associated with the bone parameter adjustment information are acquired from among the bone parameters of the three-dimensional local human body model; and the parameters of the at least one bone are adjusted according to the bone parameter adjustment information.

In conjunction with any implementation provided by the disclosure, in a case where the at least one bone includes multiple bones, the operation that the parameters of the at least one bone are adjusted according to the bone parameter adjustment information includes that: parameters of the plurality of bones are adjusted simultaneously according to the bone parameter adjustment information.

In conjunction with any implementation provided by the disclosure, the operation that the parameters of the at least one bone are adjusted according to the bone parameter adjustment information includes that: a first adjustment range corresponding to the bone parameter adjustment information is acquired; a second adjustment range of bone parameters associated with the bone parameter adjustment information is acquired; and values of the bone parameters associated with the bone parameter adjustment information are adjusted within the second adjustment range according to a change ratio of the bone parameter adjustment information within the first adjustment range.

In conjunction with any implementation provided by the disclosure, the operation that the bone parameter adjustment information is determined according to the bone parameter adjustment instruction includes that: an output change amount of a control set for the bone parameter adjustment instruction is acquired; and the bone parameter adjustment information is determined according to the output change amount.

In conjunction with any implementation provided by the disclosure, the three-dimensional local human body model includes a face model. The method further includes that: a face map is generated based on bone parameters of the face model, the face map including multiple areas, and each of the areas corresponding to a replaceable component of a face makeup of the face model; a corresponding replaceable component map is acquired for each of the areas according to parameters of the area; each replaceable component map is combined with the face map to obtain a combined map; and the combined map is mapped onto the face model to generate a face makeup of the face model.

In conjunction with any implementation provided by the disclosure, one or more of the plurality of areas are rectangular areas, parameters of each rectangular area include width and height, and the operation that a corresponding replaceable component map is acquired according to parameters of the area includes that: a replaceable component map consistent with the width and the height of the rectangular area is acquired.

In conjunction with any implementation provided by the disclosure, one or more of the plurality of areas are rectangular areas, parameters of each rectangular area include a coordinate horizontal offset value and a coordinate vertical offset value, the replaceable component map includes transparency information, and the operation that the replaceable component map is combined with the face map includes that: a replaceable component map is copied to a respective rectangular area according to the coordinate horizontal offset value and coordinate vertical offset value of the rectangular area corresponding to the replaceable component map; and the face map and the replaceable component map are mixed according to the transparency information.

In conjunction with any implementation provided by the disclosure, the replaceable component map includes transparency information, and the operation that a replaceable component map corresponding to the area is acquired includes that: texture information selected for the replaceable component is acquired; and the transparency information of the replaceable component map and the texture information are mixed to generate a replaceable component map with texture.

In conjunction with any implementation provided by the disclosure, the operation that the combined map is mapped onto the face model includes that: the combined map is mapped onto the face model according to UV texture coordinates of the face model.

In conjunction with any implementation provided by the disclosure, the three-dimensional local human body model includes a face model. The method further includes that: first bone parameters and first blend shape data corresponding to a standard face model are acquired; second bone parameters corresponding to the face model are acquired; and second blend shape data corresponding to the face model is obtained using the first blend shape data based on a transformation relationship between the second bone parameters and the first bone parameters.

In a second aspect, an apparatus for generating a three-dimensional local human body model is provided. The apparatus includes a memory storing processor-executable instructions; and a processor arranged to execute the stored processor-executable instructions to perform operations of: acquiring bone parameter adjustment information of a three-dimensional local human body model; adjusting bone parameters of the three-dimensional local human body model according to the bone parameter adjustment information; and generating the three-dimensional local human body model according to the adjusted local human bone parameters.

In a third aspect, a non-transitory computer-readable storage medium is provided. The non-transitory computer-readable storage medium has stored thereon computer-readable instructions that, when executed by a processor, cause the processor to perform a method for generating a three-dimensional local human body model, the method including: acquiring bone parameter adjustment information of the three-dimensional local human body model; adjusting bone parameters of the three-dimensional local human body model according to the bone parameter adjustment information; and generating the three-dimensional local human body model according to adjusted bone parameters.

BRIEF DESCRIPTION OF THE DRAWINGS

In order to more clearly illustrate the technical solutions of one or more embodiments of the disclosure or the conventional art, the drawings to be used in the embodiments or the conventional art will be briefly introduced below. The drawings described below are only some embodiments in one or more embodiments of the disclosure. Those of ordinary skill in the art can also obtain other drawings based on these drawings without paying any creative work.

DETAILED DESCRIPTION

In order to enable those skilled in the art to better understand the technical solutions in one or more embodiments of the disclosure, the technical solutions in one or more embodiments of the disclosure will be described clearly and completely below in conjunction with the drawings in one or more embodiments of the disclosure. The described embodiments are only a part of the embodiments of the disclosure, but not all the embodiments. All other embodiments obtained by those skilled in the art based on one or more embodiments of the disclosure without creative efforts fall within the scope of protection of the disclosure.

In a model generated based on bones, each bone may have multiple parameters. For example, the bone parameters may include at least one of the following: a displacement parameter t, a rotation parameter r, and a scaling parameter s. For a three-dimensional local human body model, such as a face model, the parameters of each bone usually include values of an x-axis, a y-axis, and a z-axis, so the parameters may be represented by $B_i=(t_x, t_y, t_z, r_x, r_y, r_z, s_x, s_y, s_z)$. $i=1, 2, \ldots, N_b$, where $N_b$ is a number of bones included in the model.

Figure 1:
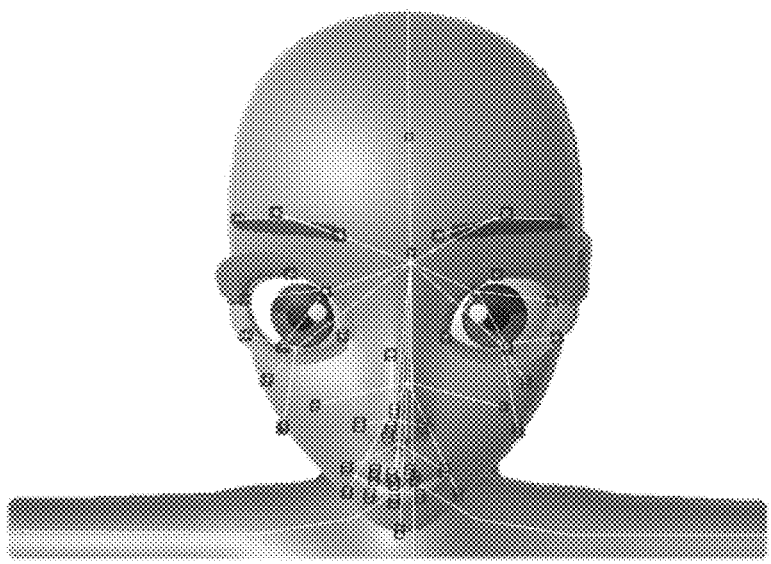
FIG. 1 is an example of a face model established based on bones provided by at least one embodiment of the disclosure.

FIG. 1 shows a schematic diagram of a face model established based on bones. The face model is a model obtained by building a skeleton based on 48 bones and performing skin processing on the basis of the skeleton. The white lines in FIG. 1 represent the bones.

By adjusting the bone parameter $B_i$, one or more of the position, direction, and size of the bone may be changed, so that the bone structure of the model can be changed. The face model in FIG. 1 is taken as an example, which contains 48 bones, and each bone has 9 parameters, that is, a user can control 48*9 parameters.

Figure 2:
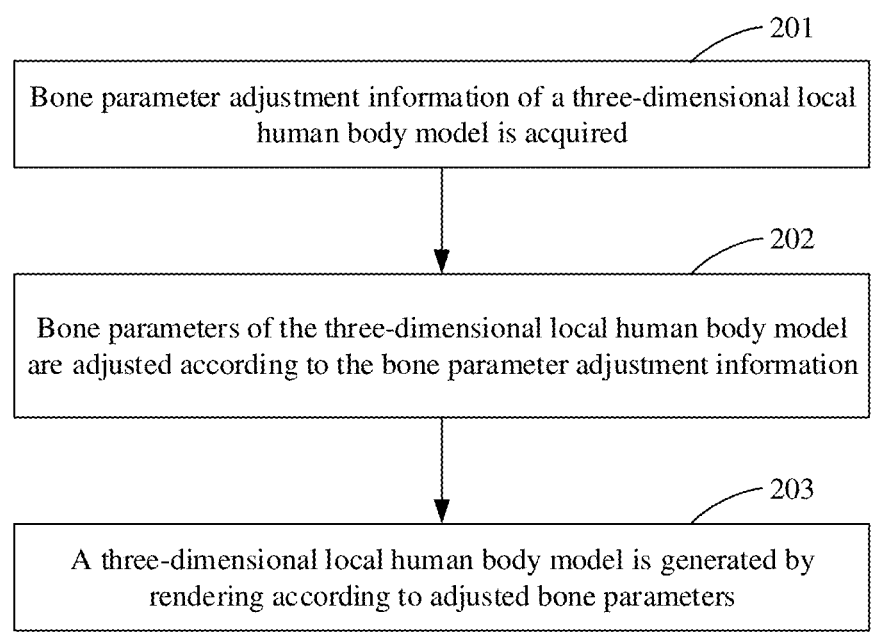
FIG. 2 is an example of a method for generating a three-dimensional local human body model provided by at least one embodiment of the disclosure.

Based on this, at least one embodiment of the disclosure provides a method for generating a three-dimensional local human body model. As shown in FIG. 2, the method may include the following operations.

In operation 201, bone parameter adjustment information of a three-dimensional local human body model is acquired.

In the present embodiment, a bone parameter adjustment instruction is received, and the bone parameter adjustment information may be determined according to the bone parameter adjustment instruction. The bone parameter adjustment information may be at least one of the following: a changed parameter value, or a relative change amount or change ratio before and after parameter value adjustment.

In operation 202, bone parameters of the three-dimensional local human body model are adjusted according to the bone parameter adjustment information.

In this operation, bone parameters in the three-dimensional local human body model are adjusted based on the changed parameter value, or the relative change amount or change ratio of the parameter value included in the bone parameter adjustment information, so that the bone parameters are changed correspondingly. For example, they are increased/decreased by the corresponding relative change amount, or increased/decreased by the corresponding change ratio. After adjusting the bone parameters, a set of adjusted bone parameters may be obtained.

In operation 203, a three-dimensional local human body model is generated by rendering according to adjusted bone parameters.

The bone parameters of the three-dimensional local human body model are adjusted to change the bone structure of the model, thereby obtaining the desired three-dimensional local human body model.

The method for generating a three-dimensional local human body model in the present embodiment may be used to generate local human body models such as a head (face) model, hand model, and a body model, and may also be used to locally adjust the human body model.

In the present embodiment, by adjusting at least one bone parameter in the local human body model based on the bone parameter adjustment information, it is possible to take into account the adjustment of the overall shape and local details of the model, which can not only achieve the purpose of rapid adjustment, but also enable fine adjustment.

In the following description, the method for generating the three-dimensional local human body model will be described in more detail. The following uses the face model as an example. However, it can be understood that the method for generating a three-dimensional local human body model may also be applied to other scenes, for example, generation of other local human body models, generation of a human body model, generation of an animal model, and generation of other models established based on bones.

When applying the method of the present embodiment to generate a three-dimensional local human body model based on bone parameters, a controller for simultaneously controlling multiple bone parameters of the three-dimensional local human body model may be preset. The controller may be regarded as a specific implementation of acquiring the above bone parameter adjustment information. Specifically, adjustment information of a plurality of bone parameters associated with the controller in the three-dimensional local human body model may be transmitted by adjusting an operating parameter of the controller (hereinafter also referred to simply as an operating parameter). The controller is set based on the bone parameters of the three-dimensional local human body model. Therefore, in the present embodiment, the bone parameters of the face model may be obtained firstly.

The bone parameters of the face model may be $B_i=(tx, ty, tz, rx, ry, rz, sx, sy, sz)$, where $i=1, 2, \ldots, N_b$, and $N_b$ is the number of bones included in the face model. By adjusting the bone parameter $B_i$, one or more of the position, direction, and size of the bone may be changed, so that the bone structure of the model can be changed. However, when the degree of freedom of the controllable parameter is too high, it is difficult for the user to adjust the local details. Therefore, in the present embodiment, the controller is provided to be able to adjust multiple bone parameters of the three-dimensional local human body model at the same time.

The controller is associated with the parameters of at least one bone in the local human body. The association here means that when the operating parameter of the controller is changed, one or more parameters of the at least one bone may change simultaneously. The at least one bone may be one or more bones belonging to a local area in the local human body.

Figure 3:
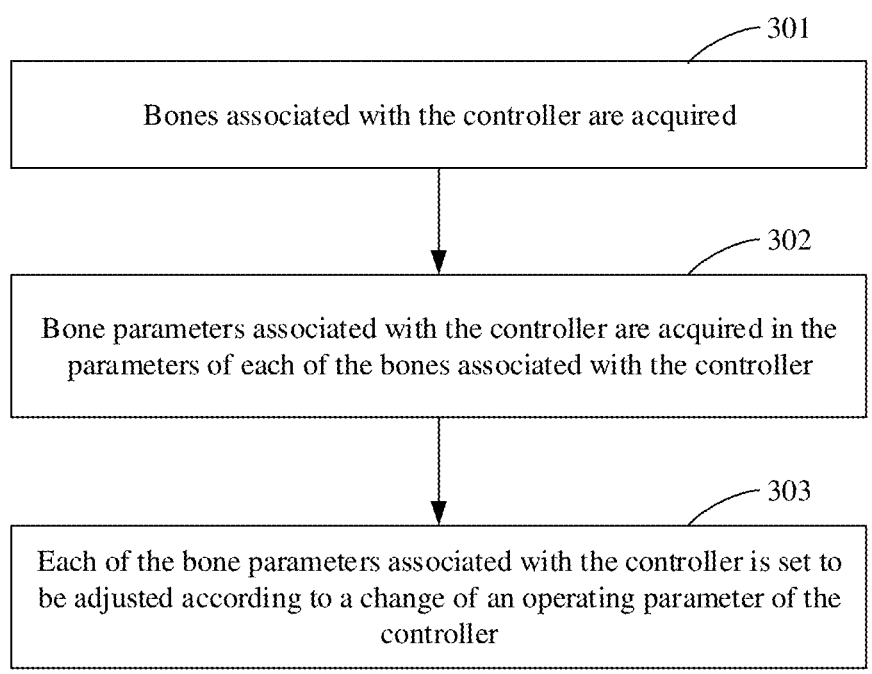
FIG. 3 is a setting method example of control parameters provided by at least one embodiment of the disclosure.

In an example, the setting of the above controller may be achieved by the following method. As shown in FIG. 3, the method may include the following operations.

In operation 301, bones associated with the controller are acquired.

Bones associated with each controller may be preset. By acquiring the bones associated with the controller, it may be determined parameters of which of the bones will be adjusted while the operating parameter of the controller is controlled.

Figure 5A:
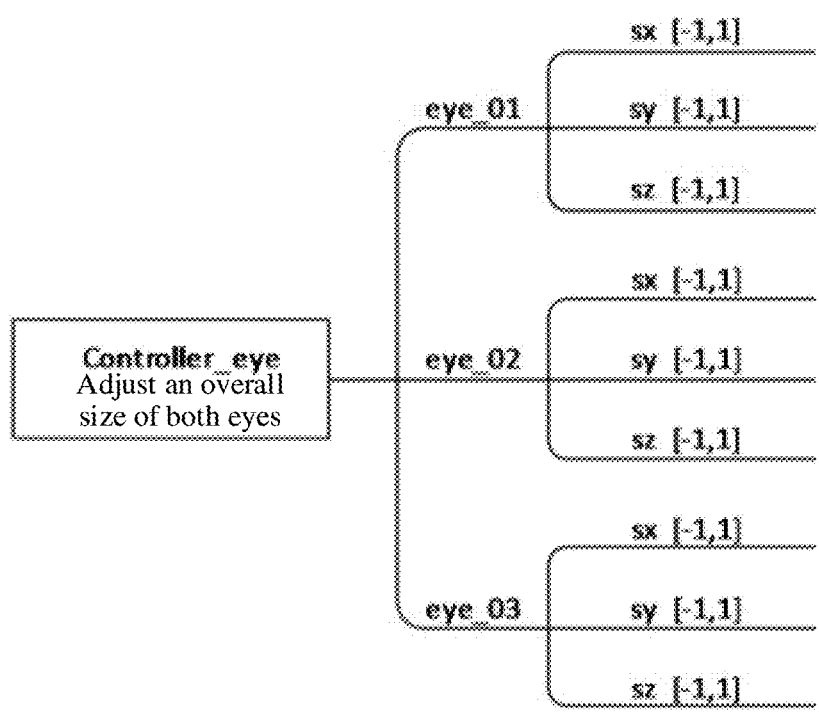
FIG. 5A is an example of a control parameter setting method for controlling an overall size of both eyes provided by at least one embodiment of the disclosure.

For each controller, the parameters of all or some bones in a local area may be associated with the controller. For example, it is assumed that there are a total of E1 bones in the eye area, but only E2 bones are adjusted (E2<E1) so that the change in the size of the eye can be controlled. Then the eye bone controller for adjusting the overall size of both eyes only needs to control the E2 bones. As shown in FIG. 5A, the eye bone controller for adjusting the overall size of the eyes is associated with the parameters of the bones eye_01, eye_02 and eye_03 of the eye area to make the eye bone controller be capable of controlling the three bones.

In operation 302, bone parameters associated with the controller are acquired from among parameters of each of the bones associated with the controller.

For each bone associated with the above controller, the controller may control all nine parameters, and may also control one or more of the nine parameters. Which parameters of the bone are associated with the controller may be preset.

Figure 4:
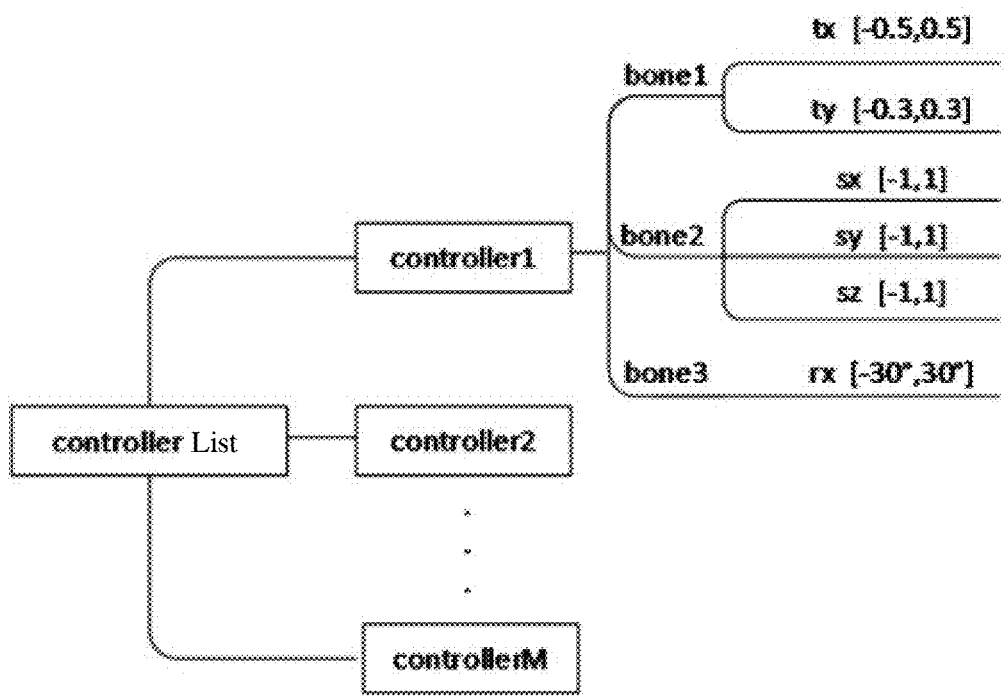
FIG. 4 is a setting example of control parameters provided by at least one embodiment of the disclosure.

FIG. 4 is taken as an example, and controller1, controller2, . . . , controllerM are various controllers, where M is the number of controllers. The controller controller1 may control three bones bone1, bone2, and bone3, and the parameters of each bone that can be specifically controlled include translation parameters (tx, ty) of bone1, scaling parameters (sx, sy, sz) of bone2 and rotation parameters (ry) of bone3. That is, by adjusting the operating parameter of the controller 'controller1', the above parameters of the three bones may be adjusted at the same time. It can be seen that, through operations 301 and 302, the parameters of at least one bone associated with the controller (specifically, associated with the operating parameter of the controller) may be acquired from among the bone parameters of the three-dimensional local human body model.

In operation 303, each of the bone parameters associated with the controller is set to be adjusted according to a change of an operating parameter of the controller.

After determining the bone parameters associated with the controller, by setting each bone parameter to be adjusted according to the change of the operating parameter of the controller, the simultaneous control of the bone parameters associated with the controller is achieved. Simultaneously adjusting multiple bone parameters associated with the controller according to the change of the operating parameter of the controller includes adjusting multiple associated bone parameters at a same change ratio as a change ratio of the operating parameter of the controller. For example, the adjustment amplitude of the value of the operating parameter of the controller is increased by $1/10$, and the adjustment amplitude of the value of multiple bone parameters associated therewith is also increased by $1/10$.

In an example, the adjustment of the bone parameters by the controller may be achieved by the following methods. The method includes the following operations.

First, a change range of the operating parameter of the controller (hereinafter may also be referred to as an adjustment range) is acquired. The change range may be preset to determine a relative change amount of the value of the operating parameter of the controller before and after adjustment.

Next, a change range of each bone parameter associated with the controller is acquired. The change range may be preset and used to indicate the change range of parameters such as bone displacement, direction, and distance adjusted according to actual needs. If the change range of a bone parameter is 0, it indicates that the parameter cannot be adjusted, that is, it is not controlled by the controller.

Then, the bone parameters associated with the controller are set to change at the same rate within the change range of the bone parameter according to the change ratio of the operating parameter of the controller within its change range. The change ratio mentioned here may also be expressed as a relative change amount. For example, for the controller controller1 in FIG. 4, if the change range of the operating parameter is [0, 1], when the value of the operating parameter of the controller changes from 0.2 to 0.3, the relative change amount is $1/10$, that is, the change ratio is $1/10$. Then, the parameter values of the bones bone1, bone2, and bone3 associated with the controller controller1 are simultaneously adjusted up by $1/10$. Thus, simultaneous adjustment of the bone parameter associated with the controller by the controller is achieved. The above changing of the bone parameters in equal proportion with the operating parameter of the controller may be implemented by a linear interpolation algorithm.

Those skilled in the art should understand that different changes may be set for different bone parameters. For example, when the value of the operating parameter of the controller controller1 changes from 0.2 to 0.3, the parameter of the bone bone1 may be adjusted up by $1/10$, while the parameters of the bones bone2 and bone3 are adjusted up by $1/5$. In other words, different bone parameters may have different change trends. It should be understood that when the operating parameter value of the controller changes from 0 to 1, each bone parameter also changes from a minimum value to a maximum value in the respective change interval, but the change process of each bone parameter may be different. The above different bone parameters change with the operating parameter of the controller in different change trends, and may be implemented by a nonlinear interpolation algorithm.

In at least one embodiment of the disclosure, the operation that bone parameter adjustment information is acquired includes that: a bone parameter adjustment instruction is received; and the bone parameter adjustment information is determined according to the bone parameter adjustment instruction. The bone parameter adjustment instruction may refer to an adjustment instruction for the operating parameter of the controller (hereinafter may be referred to simply as a controller operating instruction). According to the controller operating instruction, it is possible to determine adjustment information on the operating parameter of the controller (hereinafter may be referred to simply as controller adjustment information) as the bone parameter adjustment information.

In at least one embodiment of the disclosure, after the bone parameter adjustment information is acquired, parameters of at least one bone associated with the bone parameter adjustment information are acquired, and the parameters of the at least one bone are adjusted according to the bone parameter adjustment information. In a case where the at least one bone is a bone, parameters of the bone are adjusted according to the bone parameter adjustment information. In a case where the at least one bone is multiple bones (for example, multiple head bones), parameters of the multiple bones are adjusted according to the bone parameter adjustment information simultaneously. The operation that the parameters of the at least one bone are adjusted according to the bone parameter adjustment information may include that: a first adjustment range corresponding to the bone parameter adjustment information is acquired; a second adjustment range of bone parameters associated with the bone parameter adjustment information is acquired; and values of the bone parameters associated with the bone parameter adjustment information are adjusted within the second adjustment range according to a change ratio of the bone parameter adjustment information within the first adjustment range.

In an example, in a case where the bone parameter adjustment information includes controller adjustment information, the operation that the parameters of the at least one bone are adjusted according to the bone parameter adjustment information may specifically include that: a controller corresponding to the controller adjustment information is determined, and an adjustment range of the operating parameter of the controller is acquired as a first adjustment range; an adjustment range of each parameter of the at least one bone associated with the controller is acquired as a second adjustment range; and for each parameter of the at least one bone associated with the controller, the value of the parameter is adjusted according to the second adjustment range corresponding to the parameter and a change ratio of the controller adjustment information within the first adjustment range.

In an example, a control may be set in advance for the controller, such as a slider, and a corresponding controller operating instruction is generated by operating the control. When generating the model, by acquiring the output change amount of the control, that is, the controller adjustment information corresponding to the controller operating instruction is acquired, and the bone parameter adjustment information may be determined based on the controller adjustment information, so that the bone parameters associated with the controller, specifically the slider, can be adjusted based on the bone parameter adjustment information.

The adjustment of the overall size of eyes as shown in FIG. 5A is taken as an example to specifically describe the control of the controller on the face model.

Figure 5B:
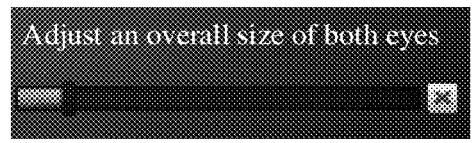
FIG. 5B is an example of a control for controlling an overall size of both eyes provided by at least one embodiment of the disclosure.

For example, the change range of the operating parameter of the controller controller1_eye used to control the overall size of both eyes is set to [0, 1], that is, the value of the operating parameter may be any value between [0, 1]. Moreover, the operating parameter value may change in this interval by operating the slider corresponding to the controller controller1_eye, as shown in FIG. 5B.

The controller controller1_eye may control three bones eye_01, eye_02, and eye_03 of the eye area, and may specifically control the scaling parameters of the bone eye_01 (sx, sy, sz), the scaling parameters of the bone eye_02 (sx, sy, sz), and the scaling parameters of the bone eye_03 (sx, sy, sz). The adjustment range of each parameter is [−1, 1], that is, the value of each parameter may be any value in the interval. The adjustment range of other parameters of the three bones is 0, that is, it cannot be adjusted by the controller controller1_eye, and is not displayed in a control list.

Figure 5C:
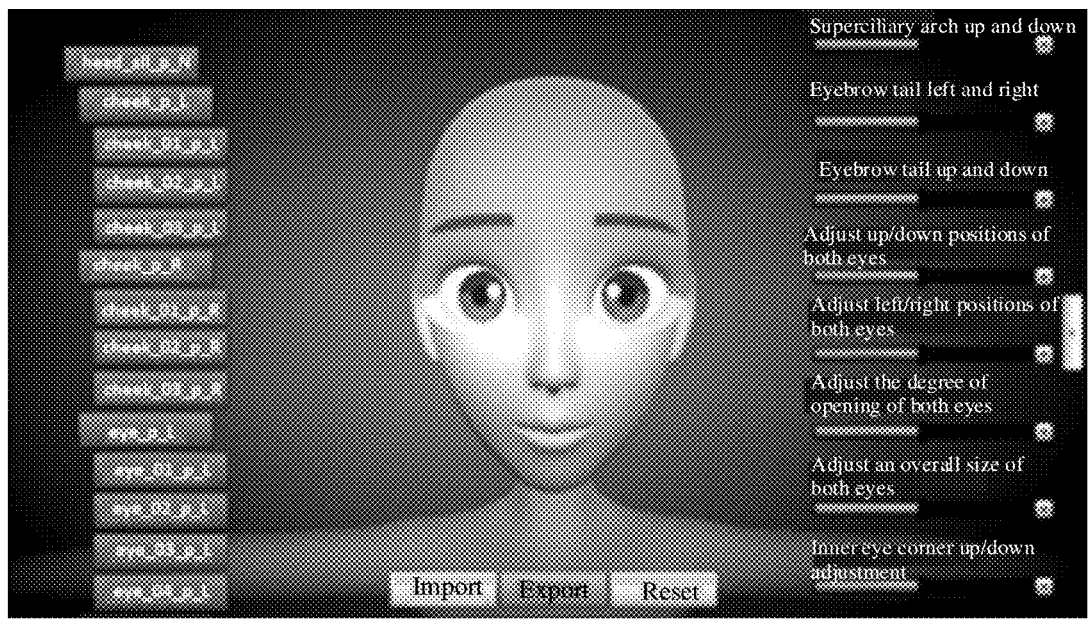
FIGS. 5C and 5D are respectively an example of a face model before adjustment and an example of a face model after adjustment provided by at least one embodiment of the disclosure.
Figure 5D:
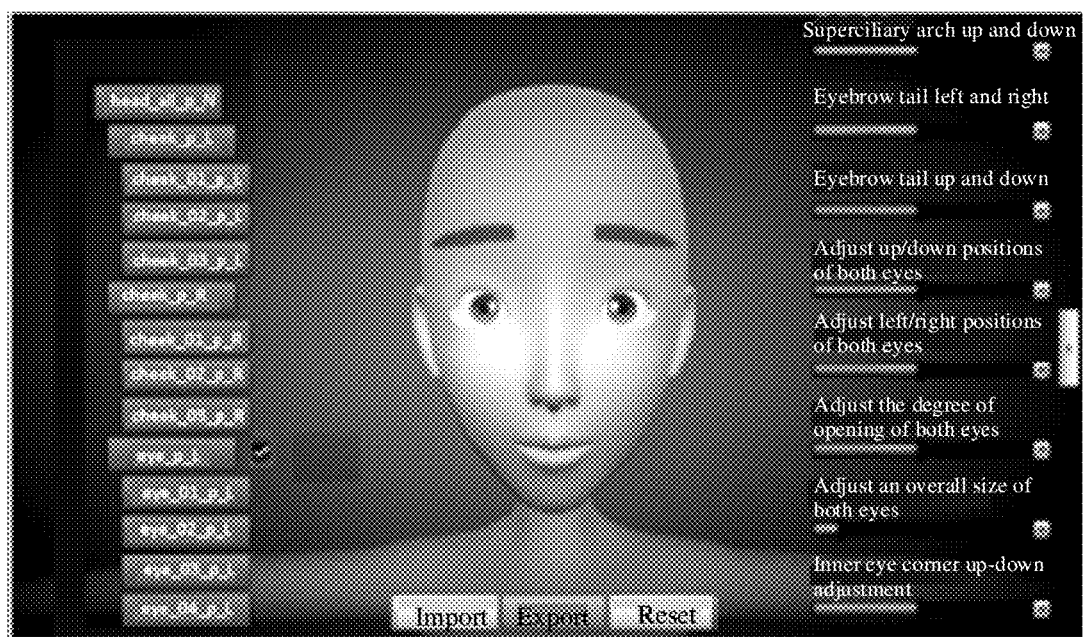

By operating the slider corresponding to the controller controller1_eye, the operating parameter value changes, and the value of the operating parameter is obtained. Then, the operating parameter value is used to linearly interpolate the association parameters of the three bones associated with the controller controller1_eye within the corresponding adjustment range to obtain the controlled value of each parameter. That is, based on the controller controller1_eye within the adjustment range of the operating parameter, the associated bone parameter value changes in an equal proportion within respective adjustment ranges. As a result, the overall size of the eyes is controlled. FIG. 7C shows a schematic diagram of an overall size of original both eyes. Each frame on the left represents bone parameters, including a head overall parameter (head_all_p_N), a left cheek overall parameter (cheek_p_L), left cheek parameters (cheek_01_p_L, cheek_02_p_L, cheek_03_p_L), a right cheek overall parameter (cheek_p_R), right cheek parameters (cheek_01_p_R, cheek_02_p_R, cheek_03_p_R), an eye overall parameter (eye_p_L), and eye parameters (eye_01_p_L, eye_02_p_L, eye_03_p_L, eye_04_p_L). The right shows slider controls respectively corresponding to multiple controllers. For example, by operating the slider "overall size of both eyes" shown in the right of FIG. 5B, the operating parameter value of the corresponding controller controller1_eye is decreased, and the effect of reducing the overall size of both eyes shown in FIG. 5D is obtained. Those skilled in the art should know that FIGS. 5C to 5D show a three-dimensional model obtained by skinning on the basis of the skeleton map, but the effects of bone changes can be reflected from it.

In an example, when the adjusted bone is one of symmetrical paired bones, the parameters of the bone symmetrical to the adjusted bone change accordingly. As shown in FIG. 2, the bones of the face are mostly symmetrical. For symmetrical bones, when the bone on one side is adjusted, the bone on the other side will also change accordingly. In other words, the parameters of the symmetrical bones are associated, the parameters of one bone have changed, and the parameters of the symmetrical bone will also change accordingly. By changing the parameters of the symmetrical bones accordingly, it is beneficial to maintain the symmetry of the face with the control operations being further reduced.

The local area mentioned in the disclosure may be an area that needs to be controlled in order to achieve certain effects by the corresponding controller. The control corresponding to the controller may be named based on the effect that can be achieved by the controller. As shown in FIGS. 5C to 5D, named controls such as "eyebrows left and right" and "eyebrows up and down" are included, which intuitively embodies the effects that can be achieved by the controller corresponding to the control, and is convenient for users to operate.

After generating a face model based on the adjusted bone parameters, there is a problem of whether it can adapt standard blend shape data of a blend shape deformer to run the expression normally. The blend shape deformer is a tool for making face expressions of face models. Since the standard blend shape data is made based on a standard face, initial bone parameters (which may be the bone parameters corresponding to the standard face) are adjusted in the disclosure. The standard face mentioned herein refers to a standard face model generated using default parameters commonly used in the related art. In order to facilitate the description, in the following, bone parameters corresponding to the standard face model are called first bone parameters, and the corresponding blend shape data is called first blend shape data, bone parameters corresponding to the face model generated using the above method in the disclosure are called second bone parameters, and the corresponding blend shape data is called second blend shape data.

The following embodiment proposes a method for updating blend shape data corresponding to a face model. The method mainly includes that: first bone parameters and first blend shape data corresponding to a standard face model are acquired; second bone parameters corresponding to the face model (which may specifically be the foregoing face model after the bone parameters are adjusted) are acquired; and second blend shape data corresponding to the face model is obtained using the first blend shape data based on a transformation relationship between the second bone parameters and the first bone parameters.

Figure 6:
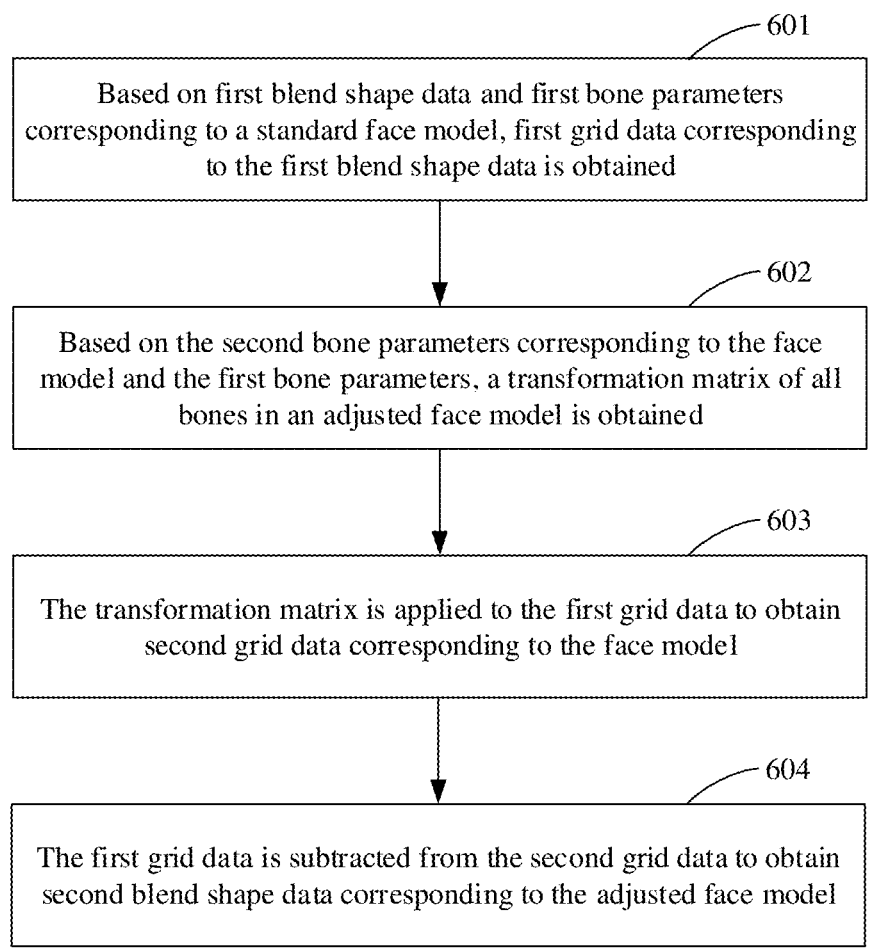
FIG. 6 is an example of a method for updating blend shape data corresponding to a face model provided by at least one embodiment of the disclosure.

In an example, the method for updating blend shape data corresponding to a face model, as shown in FIG. 6, may include the following operations.

In operation 601, based on first blend shape data and first bone parameters corresponding to a standard face model, first grid data corresponding to the first blend shape data is obtained.

First, standard grid data corresponding to the first bone parameters of the standard face model is obtained. The standard grid data may include grid vertex data corresponding to bones of the standard face model.

Usually, a difference between grid data corresponding to an expression and standard grid data is stored in the blend shape deformer. After the standard grid data is obtained, first grid data corresponding to a first blend shape deformer can be restored by adding the standard grid data to the difference stored in the first blend shape deformer (i.e., a blend shape deformer corresponding to the first blend shape data).

For example, it is supposed that the standard grid data corresponding to the standard face model is a vector [1, 1, 1, . . . , 1, 1]. The blend shape data stored in a blend shape deformer for controlling the size of eyes is a vector [0, 0, 0.5, . . . , 0, 0]. The two vectors have the same dimension size. When the blend shape deformer is operated, by adding the blend shape data to the standard grid data, the corresponding effect of eye enlargement can be obtained on the standard face. That is, the vector [1, 1, 1.5, . . . , 1, 1] obtained by adding the standard grid data [1, 1, 1, . . . , 1, 1] and the blend shape data [0, 0, 0.5, . . . , 0, 0] is the first grid data corresponding to the expression of enlarged eyes. Those skilled in the art should understand that the above grid data format is for illustration only and is not limited to the grid data format in the disclosure.

In operation 602, based on the second bone parameters corresponding to the face model and the first bone parameters, a transformation matrix of all bones in an adjusted face model is obtained.

By traversing all the bones between the aforementioned face model and the standard face model, the transformation matrix of each bone may be obtained.

In an example, the transformation matrix of each bone may be obtained by the following methods: first, based on first bone parameters corresponding to the standard face, a position matrix of each bone in the standard face model is acquired; next, based on second bone parameters corresponding to the face model, that is, based on the adjusted bone parameters, a position matrix of each bone in the face model is acquired; and the position matrix of the bone corresponding to the standard face model is divided by the position matrix of the bone corresponding to the face model to obtain the transformation matrix of each bone.

For example, the transformation matrix of the bone may be calculated by the following formula:

$$T = T_{new} * \text{inverse}(T_{normal}) \quad (1),$$

where T represents the transformation matrix of the bone, $T_{new}$ represents the position matrix of the bone corresponding to the standard face model, $T_{normal}$ represents the position matrix of the bone corresponding to the face model, and inverse( ) represents inverting the matrix.

In operation 603, the transformation matrix is applied to the first grid data to obtain second grid data corresponding to the face model.

By applying the transformation matrix of the bone to the first grid data obtained in operation 601, new grid vertex data is obtained. The idea of skeleton skin is mainly utilized to calculate new grid vertex coordinates according to a change state of a skeleton and binding information of each grid vertex, that is, the second grid data corresponding to the face model. For example, the following formula may be used for calculation:

$$\text{Vertex}_{new} = \Sigma_{i=0}^{k} T_i * \text{Vertex}_{ori} * \text{weight}_i, \quad (2),$$

where $\text{Vertex}_{new}$ represents a sum of new vertexes of the grid, $\text{Vertex}_{ori}$ represents an initial vertex of the grid, k represents that the vertex is affected by k bones, Ti represents a bone transformation matrix, and weight, represents a weight corresponding to the bone transformation matrix Ti.

In operation 604, the first grid data is subtracted from the second grid data to obtain second blend shape data corresponding to the adjusted face model.

By still taking the blend shape deformer for controlling the size of eyes as an example, the first grid data obtained in operation 601 is the grid data corresponding to the obtained eye enlargement effect. The bone transformation matrix obtained in operation 602 is applied to the first grid data, and the obtained second grid data corresponds to a face model that obtains an eye enlargement effect. By subtracting the first grid data from the second grid data, the obtained second blend shape data is data stored in the blend shape deformer corresponding to the face model.

In the present embodiment, after a new face model is generated, the transformation matrix of the bone is updated by being applied to the blend shape deformer corresponding to the standard face model and adapted to the new face model, thereby improving the accuracy of expression driving.

Those skilled in the art should understand that the method for updating blend shape data in the present embodiment is not limited to the face model generated by the foregoing method for generating a three-dimensional local human body, but may be used for any model after pinching the face. For the update of the blend shape data of the model after pinching the face, in its transformation matrix, $T_{new}$ represents the position matrix of the bone corresponding to the model after pinching the face, and $T_{normal}$ represents the position matrix of the bone corresponding to the model before pinching the face.

For the generated face model, a custom makeup is usually generated by model segmentation, including separation of a separate model for each replaceable component in the face model. Because of this way, in the rendering stage, multiple CPUs call a graphical programming interface (draw call), so the performance of the program will be seriously affected.

Figure 7:
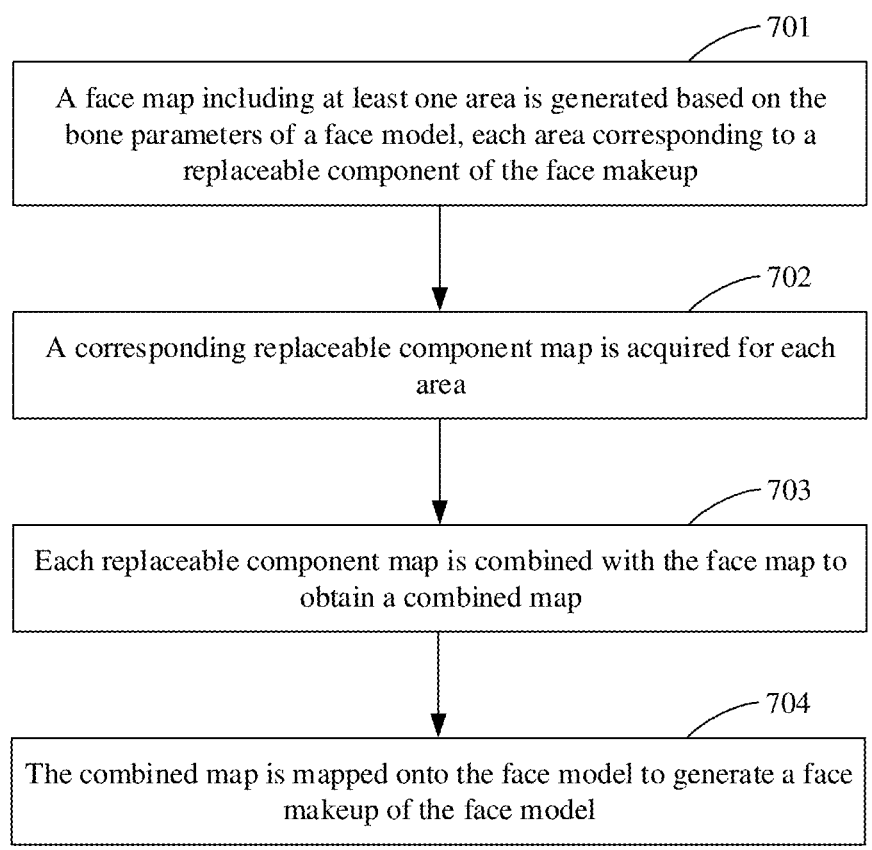
FIG. 7 is an example of a method for generating a face makeup provided by at least one embodiment of the disclosure.

Based on this, in the following embodiments, a method for generating a face makeup for a face model is proposed. As shown in FIG. 7, the following operations may be included.

In operation 701, a face map including at least one area is generated based on the bone parameters of a face model. Each area corresponds to a replaceable component of the face makeup.

In the operation, a face map may be generated according to the bone parameters of the face model. The face map may include multiple areas, and each area corresponds to a replaceable component of the face makeup. The shape of each of the multiple areas may be the same or different, for example, the multiple areas are all rectangular areas. For different bone parameters, the size and position of each rectangular area are usually different. The face makeup mentioned here includes a replaceable part for the face model, such as eyebrows, blushers, lips, and beards, rather than the irreplaceable parts already in the generated model. Those skilled in the art should understand that the replaceable parts are not limited to the above, but may also include other face makeup components.

Those skilled in the art should understand that the face map may also be a face map made and generated in other ways, and is not limited to the generation based on the bone parameters of the face model.

Figure 8A:
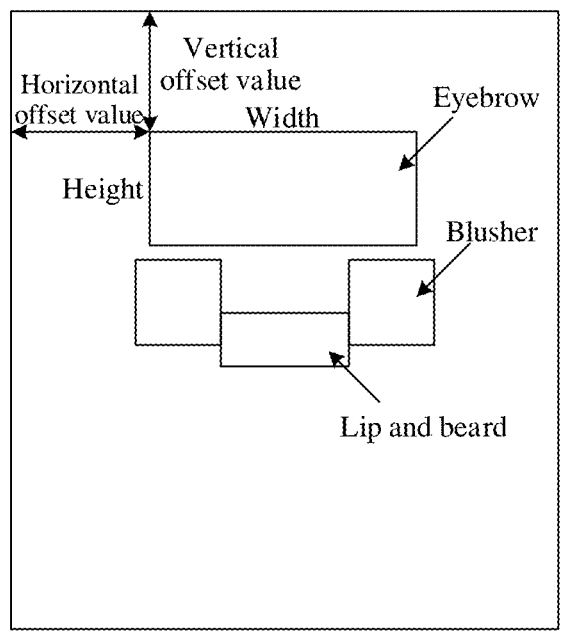
FIG. 8A is an example of a face map provided by at least one embodiment of the disclosure.

As shown in FIG. 8A, the face map includes a rectangular area corresponding to eyebrows, rectangular areas corresponding to blushers, a rectangular area corresponding to lips, or a rectangular area corresponding to lips and beards. Each rectangular area may include at least one of the following parameters: width, height, coordinate horizontal offset value, and coordinate vertical offset value. Those skilled in the art should understand that the area may also be an area of other shapes, and is not limited to a rectangular area.

In operation 702, a corresponding replaceable component map is acquired for each area.

Figure 8B:
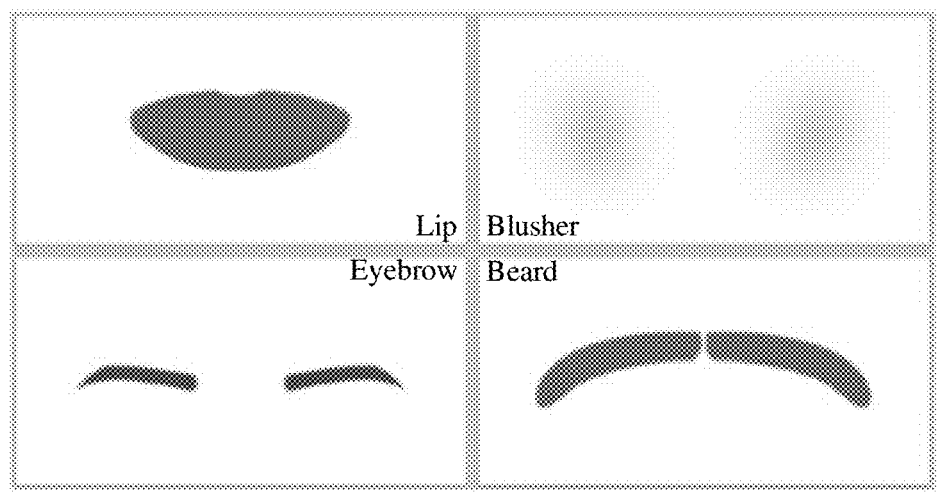
FIG. 8B is an example of a replaceable component map provided by at least one embodiment of the disclosure.

Taking the area corresponding to the replaceable component of the makeup in the face map as a rectangular area as an example, in this operation, the corresponding replaceable component map (hereinafter may also be referred to as the component map) may be made and generated according to the parameters of the rectangular area, and the corresponding component map may also be called and imported. An example of the component map is shown in FIG. 8B. Each replaceable component map is basically consistent with the width and the height of the corresponding rectangular area.

The color of each replaceable component map may be changed, and a layer of detail texture may be added to the component map.

In an example, the texture of the replaceable component map may be generated by mixing transparency information and texture information of the replaceable component map. The texture information is the texture information selected for the replaceable component map.

In operation 703, each replaceable component map is combined with the face map to obtain a combined map.

In an example, each replaceable component map of the face makeup may be combined with the face map in the following manners. A replaceable component map is copied to a respective rectangular area of the face map according to a coordinate horizontal offset value and coordinate vertical offset value of the rectangular area corresponding to the replaceable component map, and the face map and the replaceable component map are mixed according to transparency information. The transparency information is transparency information of the replaceable component map. The mixing formula is as follows:

$$Color_{final} = \begin{cases} Color_{base}, & Alpha \mathrel{!}= 1 \\ Color_{detail}, & Alpha == 1 \end{cases}, \quad (3)$$

where $Color_{final}$ represents a final color of the combined map, $Color_{base}$ represents that the color of the face map $Color_{base}$ is displayed when $Alpha\mathrel{!}=1$, and $Color_{detail}$ represents that the color of the replaceable component map $Color_{detail}$ is displayed when $Alpha==1$.

In an example, the face map may be first copied to a render texture, then each replaceable component map is copied to the corresponding rectangular area of the face map, and the render texture is used to realize the combination of the replacement component map and the face map. In another example, the face map and its corresponding shader may be copied into the render texture.

Figure 8C:
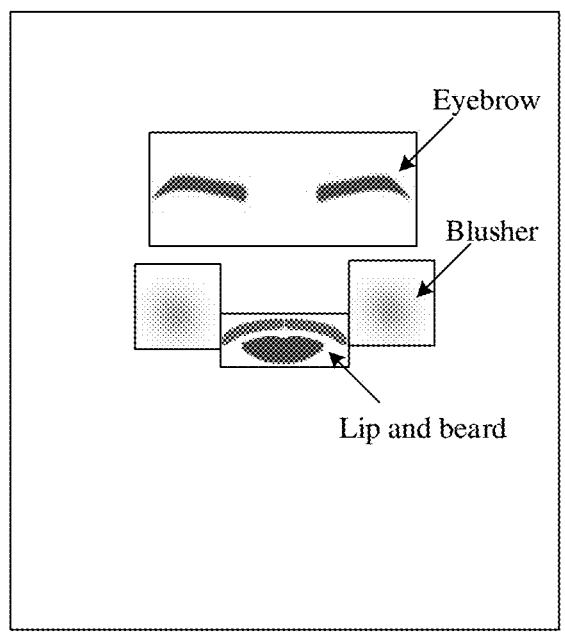
FIG. 8C is an example of a combined face map and a replaceable component map provided by at least one embodiment of the disclosure.

The result of combining the replaceable component map and the face map is shown in FIG. 8C.

In operation 704, the combined map is mapped onto the face model to generate a face makeup of the face model.

In an example, the face map may be first rendered onto a frame buffer object, and the frame buffer object is associated with the corresponding map object of the face model on a GPU according to UV texture coordinates of the face model, so as to realize the mapping of the combined map onto the face model.

Figure 9A:
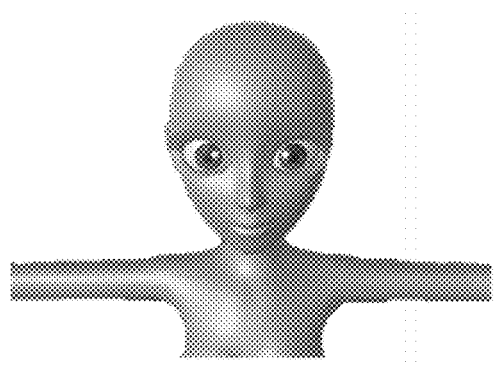
FIGS. 9A and 9B are respectively a face model before generation of a makeup and a face model after generation of the makeup provided by at least one embodiment of the disclosure.
Figure 9B:
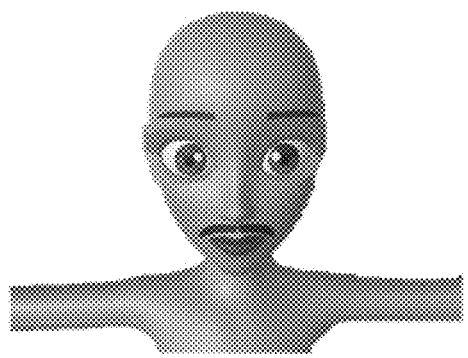

FIG. 9A shows an initial face model, and FIG. 9B shows a face model after a face makeup is generated by the above method.

In the present embodiment, by generating a face map and a map corresponding to each replaceable component in a face makeup, the method of combining and then drawing is used to improve the rendering efficiency.

Figure 10A:
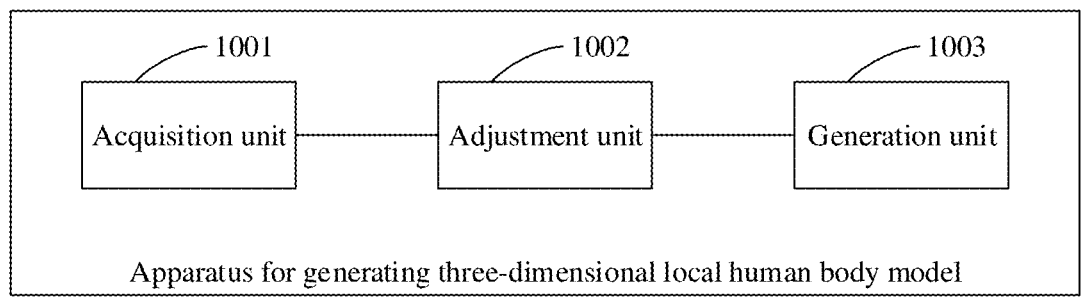
FIG. 10A is an example of an apparatus for generating a three-dimensional local human body model provided by at least one embodiment of the disclosure.

FIG. 10A provides an apparatus for generating a three-dimensional local human body model. As shown in FIG. 10A, the apparatus may include: an acquisition unit 1001, configured to acquire bone parameter adjustment information of a three-dimensional local human body model; an adjustment unit 1002, configured to adjust bone parameters of the three-dimensional local human body model according to the bone parameter adjustment information; and a generation unit 1003, configured to generate the three-dimensional local human body model according to the adjusted local human bone parameters.

Figure 10B:
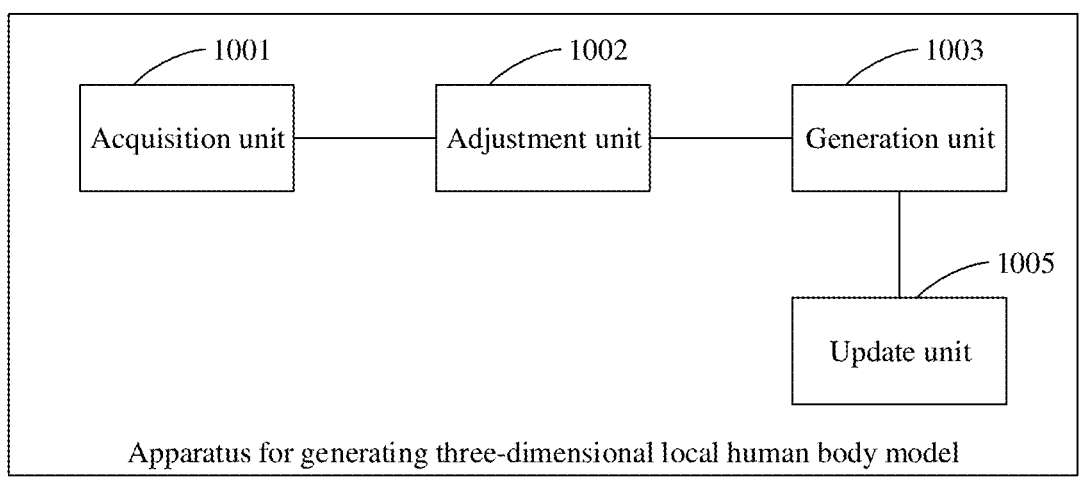
FIG. 10B is an example of an apparatus for generating a three-dimensional local human body model provided by at least one embodiment of the disclosure.

FIG. 10B provides another apparatus for generating a three-dimensional local human body model. In a case where the three-dimensional local human body model is a face model, as shown in FIG. 10B, the apparatus may further include an update unit 1005, configured to obtain second blend shape data corresponding to the face model based on the pre-obtained first bone parameters and first blend shape data corresponding to the standard face model, and the second bone parameters corresponding to the face model.

Figure 10C:
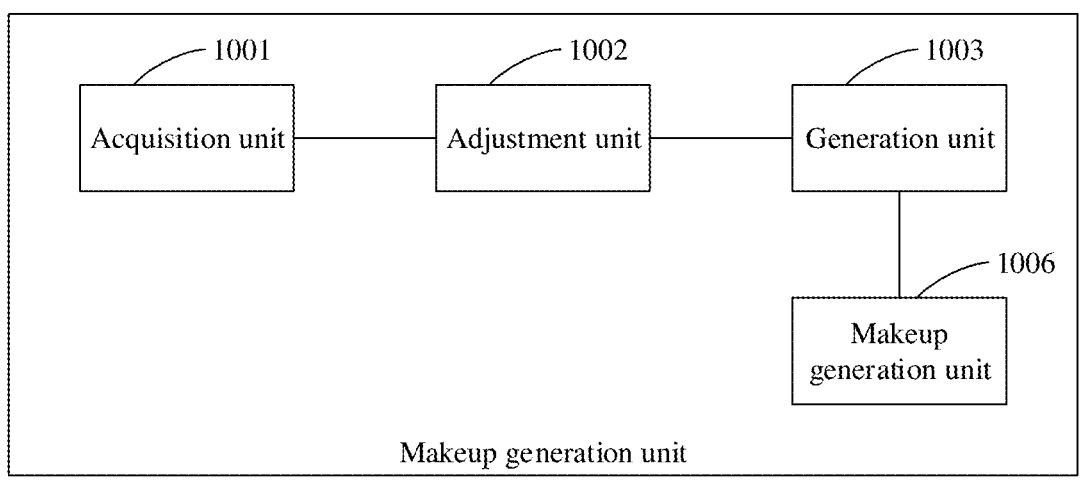
FIG. 10C is an example of an apparatus for generating a three-dimensional local human body model provided by at least one embodiment of the disclosure.

FIG. 10C provides another apparatus for generating a three-dimensional local human body model. In a case where the three-dimensional local human body model is a face model. As shown in FIG. 10C, the apparatus may further include a makeup generation unit 1006, configured to generate a face map for the face model, and specifically configured to generate a face map based on bone parameters of the face model, the face map including multiple areas, and each of the areas corresponding to a replaceable component of a face makeup of the face model; acquire a corresponding replaceable component map for each of the areas based on parameters of the area; combine each replaceable component map with the face map to obtain a combined map; and map the combined map onto the face model to generate the face makeup of the face model.

Figure 11:
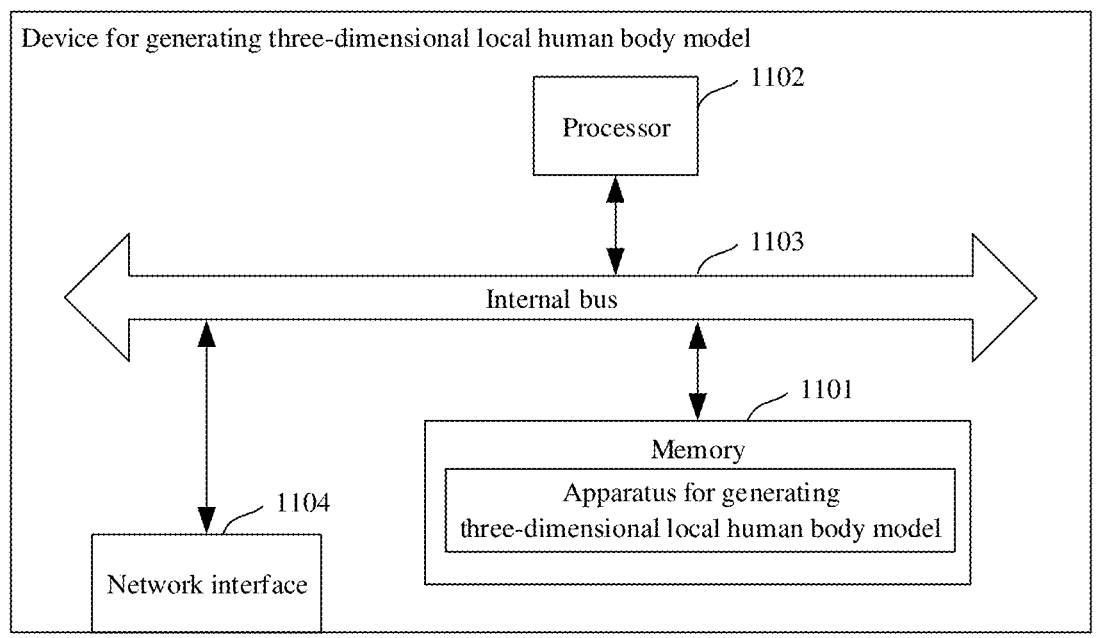
FIG. 11 is an example of a device for generating a three-dimensional local human body model provided by at least one embodiment of the disclosure.

FIG. 11 is a device for generating a three-dimensional local human body model provided by at least one embodiment of the disclosure. As shown in FIG. 11, the device may include a memory 1101 and a processor 1102. The memory 101 is configured to store computer instructions executable by the processor 1102, and the processor 1102 is configured to implement the method for generating a three-dimensional local human body model according to any embodiment of the disclosure when executing the computer instructions.

At least one embodiment of the disclosure further provides a computer-readable storage medium, which has computer programs stored thereon. The programs, when executed by a processor, implement the method for generating a three-dimensional local human body model in the disclosure.

In the method, apparatus and device for generating a three-dimensional local human body model of the disclosure, the local human bone parameters are adjusted through the bone parameter adjustment information to realize the simultaneous adjustment of at least one bone parameter in the local human body, so that the overall shape and local details of the model can be adjusted simultaneously. Therefore, it is possible to not only achieve the purpose of rapid adjustment but also enable fine adjustment.

Those skilled in the art should understand that one or more embodiments of the disclosure may be provided as a method, system, or computer program product. Therefore, one or more embodiments of the disclosure may take the form of an entirely hardware embodiment, an entirely software embodiment, or an embodiment combining software and hardware. Moreover, one or more embodiments of the disclosure may take the form of a computer program product implemented on one or more computer-available storage media (including but not limited to a disk memory, a CD-ROM, an optical memory, etc.) containing computer-available program code.

The embodiments in the disclosure are described in a progressive manner. The same or similar parts between the embodiments can be referred to each other, and each embodiment focuses on the differences from other embodiments. In particular, for the embodiment of the data processing device, since it is basically similar to the method embodiment, the description is relatively simple, and the relevant part can be referred to the description of the method embodiment.

The foregoing describes specific embodiments of the disclosure. Other embodiments are within the scope of the following claims. In some cases, the actions or operations recited in the claims may be performed in a different order than in the embodiments and still achieve the desired results. In addition, the processes depicted in the drawings do not necessarily require the particular order shown or sequential order to achieve the desired results. In some embodiments, multitasking and parallel processing are also possible or may be advantageous.

Embodiments of the subject matter and functional operations described in the disclosure may be implemented in: digital electronic circuits, tangibly embodied computer software or firmware, computer hardware including the structures disclosed in the disclosure and their structural equivalents, or one or more combinations thereof. Embodiments of the subject matter described in the disclosure may be implemented as one or more computer programs, that is, one or more modules of computer program instructions encoded on a tangible non-transitory program carrier to be executed by a data processing apparatus or to control the operation of the data processing device. Alternatively or additionally, the program instructions may be encoded on an artificially generated propagation signal, such as a machine-generated electrical, optical, or electromagnetic signal, which is generated to encode and transmit the information to a suitable receiver apparatus to be executed by the data processing apparatus. The computer storage medium may be a machine-readable storage device, a machine-readable storage substrate, a random or serial access memory device, or a combination of one or more of them.

The processes and logic flows described in the disclosure may be performed by one or more programmable computers that execute one or more computer programs to perform corresponding functions by operating according to input data and generating output. The processing and logic flow may also be performed by dedicated logic circuits such as a Field Programmable Gate Array (FPGA) or an Application Specific Integrated Circuit (ASIC), and the apparatus may also be implemented as a dedicated logic circuit.

Computers suitable for executing computer programs include, for example, general-purpose and/or special-purpose microprocessors, or any other type of central processing unit. Generally, the central processing unit will receive instructions and data from a read-only memory and/or a random access memory. The basic components of a computer include a central processing unit for implementing or executing instructions and one or more memory devices for storing instructions and data. Typically, the computer will also include one or more mass storage devices for storing data, such as magnetic disks, magneto-optical disks, or optical disks, or the computer will be operably coupled to the mass storage device to receive data from or transmit data to it, or both. However, the computer does not necessarily have such a device. In addition, the computer may be embedded in another device, such as some of a mobile phone, a Personal Digital Assistant (PDA), a mobile audio or video player, a game console, a Global Positioning System (GPS) receiver, or, for example, a portable storage device such as a Universal Serial Bus (USB) flash drive.

Computer-readable media suitable for storing computer program instructions and data include all forms of non-volatile memory, media, and memory devices, including, for example, semiconductor memory devices (such as EPROM, EEPROM, and flash memory devices), magnetic disks (such as internal hard drives, or mobile disks), magneto-optical disks and CD ROM and DVD-ROM disks. The processor and the memory may be supplemented by, or incorporated in, dedicated logic circuits.

Although the disclosure contains many specific implementation details, these should not be construed as limiting the scope of any disclosure or the claimed scope, but are mainly used to describe features of specific embodiments of particular disclosures. Certain features described in multiple embodiments within the disclosure may also be implemented in combination in a single embodiment. On the other hand, various features described in a single embodiment may also be implemented separately in multiple embodiments or in any suitable sub-combination. In addition, although features may function in certain combinations as described above and even initially claimed as such, one or more features from the claimed combination may, in some cases, be removed from the combination and the claimed combinations may point to sub-combinations or variations of sub-combinations.

Similarly, although the operations are depicted in a specific order in the drawings, this should not be construed as requiring these operations to be performed in the specific order shown or sequentially, or requiring all illustrated operations to be performed to achieve the desired result. In some cases, multitasking and parallel processing may be advantageous. In addition, the separation of various system modules and components in the above embodiments should not be understood as requiring such separation in all embodiments, and it should be understood that the described program components and systems may generally be integrated together in a single software product, or packaged into multiple software products.

Thus, specific embodiments of the subject matter have been described. Other embodiments are within the scope of the appended claims. In some cases, the actions recited in the claims may be performed in a different order and still achieve the desired results. In addition, the processes depicted in the drawings are not necessarily in the specific order shown or sequential order to achieve the desired results. In some implementations, multitasking and parallel processing may be advantageous.

The above are only preferred embodiments of one or more embodiments of the disclosure, and are not intended to limit one or more embodiments of the disclosure. Any modifications, equivalent replacements, improvements, etc., made within the spirit and principle of one or more embodiments of the disclosure should be included within the scope of protection of one or more embodiments of the disclosure.

The invention claimed is:

1. A method for generating a three-dimensional local human body model, comprising:
    acquiring bone parameter adjustment information of the three-dimensional local human body model;
    adjusting bone parameters of the three-dimensional local human body model according to the bone parameter adjustment information; and
    generating the three-dimensional local human body model according to adjusted bone parameters,
    wherein the three-dimensional local human body model comprises a face model, and the method further comprises:
        generating a face map based on bone parameters of the face model, the face map comprising a plurality of areas, and each of the areas corresponding to a replaceable component of a face makeup of the face model;
acquiring a corresponding replaceable component map for each of the areas according to parameters of the area;
combining each replaceable component map with the face map to obtain a combined map; and
mapping the combined map onto the face model to generate the face makeup of the face model.

2. The method of claim 1, wherein acquiring bone parameter adjustment information of the three-dimensional local human body model comprises:
receiving a bone parameter adjustment instruction; and
determining the bone parameter adjustment information according to the bone parameter adjustment instruction.

3. The method of claim 2, wherein determining the bone parameter adjustment information according to the bone parameter adjustment instruction comprises:
acquiring an output change amount of a control set for the bone parameter adjustment instruction; and
determining the bone parameter adjustment information according to the output change amount.

4. The method of claim 1, wherein adjusting bone parameters of the three-dimensional local human body model according to the bone parameter adjustment information comprises:
acquiring parameters of at least one bone associated with the bone parameter adjustment information from among the bone parameters of the three-dimensional local human body model; and
adjusting the parameters of the at least one bone according to the bone parameter adjustment information.

5. The method of claim 4, wherein in a case where the at least one bone comprises a plurality of bones, adjusting the parameters of the at least one bone according to the bone parameter adjustment information comprises:
adjusting parameters of the plurality of bones simultaneously according to the bone parameter adjustment information.

6. The method of claim 4, wherein adjusting the parameters of the at least one bone according to the bone parameter adjustment information comprises:
acquiring a first adjustment range corresponding to the bone parameter adjustment information;
acquiring a second adjustment range of bone parameters associated with the bone parameter adjustment information; and
adjusting values of the bone parameters associated with the bone parameter adjustment information within the second adjustment range according to a change ratio of the bone parameter adjustment information within the first adjustment range.

7. The method of claim 1, wherein one or more of the plurality of areas are rectangular areas, parameters of each rectangular area comprise width and height, and acquiring the corresponding replaceable component map according to the parameters of the area comprises:
acquiring a replaceable component map consistent with the width and the height of the rectangular area.

8. The method of claim 1, wherein one or more of the plurality of areas are rectangular areas, parameters of each rectangular area comprise a coordinate horizontal offset value and a coordinate vertical offset value, the replaceable component map comprises transparency information, and combining the replaceable component map with the face map comprises:
copying a replaceable component map to a respective rectangular area according to the coordinate horizontal offset value and coordinate vertical offset value of the rectangular area corresponding to the replaceable component map; and
mixing the face map and the replaceable component map according to the transparency information.

9. The method of claim 1, wherein the replaceable component map comprises transparency information, and acquiring the replaceable component map corresponding to the area comprises:
acquiring texture information selected for the replaceable component; and
mixing the transparency information of the replaceable component map and the texture information to generate a replaceable component map with texture.

10. The method of claim 1, wherein mapping the combined map onto the face model comprises:
mapping the combined map onto the face model according to ultraviolet (UV) texture coordinates of the face model.

11. The method of claim 1, wherein the method further comprises:
acquiring first bone parameters and first blend shape data corresponding to a standard face model;
acquiring second bone parameters corresponding to the face model; and
obtaining second blend shape data corresponding to the face model using the first blend shape data based on a transformation relationship between the second bone parameters and the first bone parameters.

12. An apparatus for generating a three-dimensional local human body model, comprising:
a memory storing processor-executable instructions; and
a processor arranged to execute the stored processor-executable instructions to perform operations of:
acquiring bone parameter adjustment information of the three-dimensional local human body model;
adjusting bone parameters of the three-dimensional local human body model according to the bone parameter adjustment information; and
generating the three-dimensional local human body model according to adjusted bone parameters,
wherein the three-dimensional local human body model comprises a face model, and the processor is arranged to execute the stored processor-executable instructions to further perform operations of:
generating a face map based on bone parameters of the face model, the face map comprising a plurality of areas, and each of the areas corresponding to a replaceable component of a face makeup of the face model;
acquiring a corresponding replaceable component map for each of the areas according to parameters of the area;
combining each replaceable component map with the face map to obtain a combined map; and
mapping the combined map onto the face model to generate the face makeup of the face model.

13. The apparatus of claim 12, wherein acquiring bone parameter adjustment information of the three-dimensional local human body model comprises:
receiving a bone parameter adjustment instruction; and
determining the bone parameter adjustment information according to the bone parameter adjustment instruction.

14. The apparatus of claim 13, wherein determining the bone parameter adjustment information according to the bone parameter adjustment instruction comprises:
- acquiring an output change amount of a control set for the bone parameter adjustment instruction; and
- determining the bone parameter adjustment information according to the output change amount.

15. The apparatus of claim 12, wherein adjusting bone parameters of the three-dimensional local human body model according to the bone parameter adjustment information comprises:
- acquiring parameters of at least one bone associated with the bone parameter adjustment information from among the bone parameters of the three-dimensional local human body model; and
- adjusting the parameters of the at least one bone according to the bone parameter adjustment information.

16. The apparatus of claim 15, wherein in a case where the at least one bone comprises a plurality of bones, adjusting the parameters of the at least one bone according to the bone parameter adjustment information comprises:
- adjusting parameters of the plurality of bones simultaneously according to the bone parameter adjustment information.

17. The apparatus of claim 15, wherein adjusting the parameters of the at least one bone according to the bone parameter adjustment information comprises:
- acquiring a first adjustment range corresponding to the bone parameter adjustment information;
- acquiring a second adjustment range of bone parameters associated with the bone parameter adjustment information; and
- adjusting values of the bone parameters associated with the bone parameter adjustment information within the second adjustment range according to a change ratio of the bone parameter adjustment information within the first adjustment range.

18. A non-transitory computer-readable storage medium having stored thereon computer-readable instructions that, when executed by a processor, cause the processor to perform a method for generating a three-dimensional local human body model, the method comprising:
- acquiring bone parameter adjustment information of the three-dimensional local human body model;
- adjusting bone parameters of the three-dimensional local human body model according to the bone parameter adjustment information; and
- generating the three-dimensional local human body model according to adjusted bone parameters,
- wherein the three-dimensional local human body model comprises a face model, and the method further comprises:
  - generating a face map based on bone parameters of the face model, the face map comprising a plurality of areas, and each of the areas corresponding to a replaceable component of a face makeup of the face model;
  - acquiring a corresponding replaceable component map for each of the areas according to parameters of the area;
  - combining each replaceable component map with the face map to obtain a combined map; and
  - mapping the combined map onto the face model to generate the face makeup of the face model.

19. The non-transitory computer-readable storage medium of claim 18, wherein acquiring bone parameter adjustment information of the three-dimensional local human body model comprises:
- receiving a bone parameter adjustment instruction; and
- determining the bone parameter adjustment information according to the bone parameter adjustment instruction.

20. The non-transitory computer-readable storage medium of claim 18, wherein adjusting bone parameters of the three-dimensional local human body model according to the bone parameter adjustment information comprises:
- acquiring parameters of at least one bone associated with the bone parameter adjustment information from among the bone parameters of the three-dimensional local human body model; and
- adjusting the parameters of the at least one bone according to the bone parameter adjustment information.

* * * * *